(12) United States Patent
Gutierrez et al.

(10) Patent No.: US 6,244,394 B1
(45) Date of Patent: Jun. 12, 2001

(54) PARKING BRAKE FOR MOTOR VEHICLES

(75) Inventors: Carmelo Gutierrez, Ehringshausen-Katzenfurt; Thomas Schmidt, Hungen/Rodheim; Rainer Sell, Wetzlar, all of (DE)

(73) Assignee: Kuster & Co. GmbH, Ehringshausen (DE)

( * ) Notice: Subject to any disclaimer, the term of this patent is extended or adjusted under 35 U.S.C. 154(b) by 0 days.

(21) Appl. No.: 09/367,489

(22) PCT Filed: Dec. 17, 1998

(86) PCT No.: PCT/EP98/08285

§ 371 Date: Aug. 17, 1999

§ 102(e) Date: Aug. 17, 1999

(87) PCT Pub. No.: WO99/30940

PCT Pub. Date: Jun. 24, 1999

(30) Foreign Application Priority Data

Dec. 17, 1997 (DE) .............................. 197 55 933

(51) Int. Cl.⁷ .................................................. F16D 55/08
(52) U.S. Cl. .................. 188/72.8; 188/2 D; 188/156; 188/162; 188/265
(58) Field of Search ................. 188/2 R, 2 D, 188/72.8, 156, 162, 171, 265

(56) References Cited

U.S. PATENT DOCUMENTS

| 4,804,073 | * | 2/1989 | Taig et al. | 188/72.8 |
| 4,865,165 | | 9/1989 | Taig | 188/156 |
| 5,148,894 | * | 9/1992 | Eddy, Jr. | 188/265 |
| 5,180,038 | * | 1/1993 | Arnold et al. | 188/171 |
| 5,590,744 | * | 1/1997 | Belmond | 188/265 |

FOREIGN PATENT DOCUMENTS

| 0 710 595 | 5/1996 | (EP) . |
| 98/56633 | 12/1998 | (WO) . |

* cited by examiner

*Primary Examiner*—Robert J. Oberleitner
*Assistant Examiner*—Mariano Sy
(74) *Attorney, Agent, or Firm*—Liniak, Berenato, Longacre & White

(57) ABSTRACT

The invention relates to a parking brake system for motor vehicles. The system has an adjusting unit (9) comprising a motor-driven drive mechanism (10) in order to tighten or loosen an actuating pull (18, 19) of a brake device (7), whereby the drive mechanism (10) is drive connected to a component (5) which is mounted in a non-displaceable manner with regard to the longitudinal axis (6) such that it can rotate around said longitudinal axis (6). The component (5) is rotationally fixed to a telescopic device (4) arranged such that it can be displaced in the direction of the longitudinal axis (6). The axial length of the telescopic device (4) is increased or decreased according to the direction of rotation of the component (5), and each axial end (2, 3) of the telescopic device (4) is respectively connected to an actuating pull (18, 19) for a brake of the brake device (7) in an indirect or direct manner. In addition, the telescopic device (4) is constructed by a hollow shaft and a single spindle (20) which is mounted in the hollow shaft such that it can rotate. Said hollow shaft is preferably configured as a splined shaft (15) and can be displaced in the direction of the longitudinal axis (6).

9 Claims, 5 Drawing Sheets

PARKING BRAKE FOR MOTOR VEHICLES

BACKGROUND OF THE INVENTION

1. Field of the Invention

The invention relates to a parking brake system for vehicles, in particular passenger vehicles, in accordance with the preamble of claim 1.

2. Description of Related Art

A parking brake system of this type has already been disclosed in EP 0 710 595 A1. This known parking brake system has an adjusting unit which can be actuated, by means of a motor drive, for applying or releasing at least one actuating pull of a brake device of the vehicle. The drive is drive-connected to a component which is mounted such that it can rotate about a longitudinal axis and such that it is non-displaceable with respect to the longitudinal axis, while the component itself is coupled in a rotationally fixed manner to a telescopic device which is arranged such that it can be displaced in the direction of the longitudinal axis. The axial length of the telescopic device can be increased or reduced as a function of the direction of rotation of the component. A respective actuating pull is coupled to each axial end of the telescopic device, the actuating pulls being connected in each case to a brake of the brake device. The telescopic device of the known parking brake system is distinguished in that the drive causes two threaded rods which have an opposed thread pitch to rotate, the threaded rods being in engagement with the internal threads of corresponding sleeves which are mounted in a rotationally fixed manner. A rotation of the two threaded rods therefore results in the corresponding sleeves or the actuating pulls being displaced axially. This known parking brake system is formed in a fairly complicated manner with regard to the structural design and has a multiplicity of parts.

DE 42 05 590 A1 has already disclosed a further parking brake system for motor vehicles, having a foot-operated brake pedal. In this case, an additional adjusting unit having a motor drive is provided, the unit acting directly on the brake pedal via a coupling device. Pressing of a button, which is situated, for example, in the control handle of the vehicle transmission, causes the direction of rotation of the electric motor of the adjusting device to be reversed in each case, so that the brake pedal is pivoted downward or released upward again by the electric motor. The brake pedal is locked mechanically via the transmission, which is of self-locking design, of the adjusting unit. The parking brake system has an electronic control device with which the operating current of the electric motor can be detected and therefore information on the angle of rotation of the transmission spur gear and therefore on the braking force and the instantaneous travel of the brake cable displacement can be obtained. However, in the case of this known parking brake system failure of the motor drive may be a problem. If a plurality of brakes of the vehicle are to be actuated by means of the parking brake system, a further problem is that an uneven application of the actuating pulls may occur because of, for example, the brakes wearing at different rates.

The unpublished patent application 197 28 135.4 of the applicant furthermore discloses a parking brake system which is provided with two motor drives so that in the event of one drive malfunctioning, the parking brake system continues to be fully functional. However, this measure constitutes a considerable, technical outlay.

In contrast, the invention is based on the object of developing a parking brake system having the features mentioned at the beginning in such a manner that a technically uncomplicated, simplified design is provided. In accordance with a coordinated aspect of the invention, the intention is for the parking brake system to be mechanically releasable in the event of a fault or in the event of a failure of the motor drive.

The main object of the invention, in the case of the parking brake system having the features mentioned at the beginning, is achieved below by the features of claim 1. The telescopic device is formed by the hollow shaft, which is preferably designed as a splined shaft, and by a single spindle, threaded rod or the like, which is mounted rotatably in the hollow shaft. As a result of the hollow shaft being designed as a splined shaft and the gearwheel having a corresponding splined hub, the hollow shaft can be freely displaced, with regard to the gearwheel, in the direction of the longitudinal axis, there nevertheless being a rotationally fixed coupling between the gearwheel and the shaft. By this means, the structural design is simplified and the number of parts required reduced. As a result of the telescopic device or the hollow shaft and spindle being mounted in an axially displaceable manner on the component or in a floating manner in a housing of the parking brake system, there is a compensating action between the two actuating pulls for the two brakes, so that an even braking action of the two brakes is ensured. Moreover, the entire parking brake system is not subjected to a one-sided force action and, as a result, further high, mechanical loads on the parking brake system are avoided. The housing of the parking brake system is possibly acted upon merely by a differential force between the coupling points of the brake pulls, since the entire telescopic device is mounted in a floating manner in the housing of the parking brake system.

SUMMARY OF THE INVENTION

The component is preferably designed as a gearwheel having an axial splined hub. In this case, the gearwheel is caused to rotate by the motor drive, which is designed in particular as an electric motor, via a set of gears.

According to another exemplary embodiment of the invention, the shaft advantageously has an axial bore which is provided with an internal thread and accommodates at least one spindle, threaded rod or the like having an external thread. In this case, the internal pulls of the two actuating pulls can in each case be fastened indirectly or directly to a free end of the shaft and the spindle.

However, there is also the possibility of two spindles, threaded rods or the like each having an opposed thread pitch being accommodated in the bore of the shaft. The internal pulls of the actuating pulls are then indirectly or directly fastened to the respectively free ends of the two spindles, threaded rods or the like.

As a result of a force sensor, which is connected to a control of the adjusting unit, being integrated in the telescopic device, there is the possibility of detecting unacceptable operating states of the parking brake system and of optionally switching off the motor drive.

According to a particularly advantageous, independent aspect, a release device, with which the mechanical connection of the axial ends of the telescopic device can be released, is integrated in the telescopic device. In the event, for example, of a failure of the motor drive, the brakes which have been applied can be released by the release device being actuated, for example, by the vehicle driver using an actuating pull or the like, and the mechanical connection of the axial ends of the telescopic device thereby being released. As a consequence of the elastic forces of the brakes, which forces act upon the actuating pulls, the brakes are then opened and so the parking brake can also be released without operating the motor drive or in the event of a failure of the latter.

It has proven advantageous in this case for the release device to have a pull which interacts with a stud, peg or the like and is placed into a socket, and in particular is pretensioned in the locking position. If the pull is in the locking position, the entire telescopic device can be considered as a mechanically rigid unit, the distance between the free ends of the telescopic device being determined merely by the relative position of the shaft and spindle. However, if the pull is transferred from the locking position into an unlocking position, this rigid connection of the free ends of the telescopic device is removed, so that regardless of whether the motor drive is actuated, the telescopic device can automatically extend, because of the elastic forces of the brakes, which forces act upon the telescopic device, and the brakes of the vehicle are thereby released.

The pull can advantageously be transferred into the unlocking position by means of an actuating pull. In this case, this actuating pull is preferably actuated by the vehicle driver in the event of a failure of the motor drive.

It has furthermore proven advantageous for the two free axial ends of the telescopic device to be connected in each case to an internal pull of the actuating pulls, and for the external sheaths of the actuating pulls to be accommodated in axial sockets on the end sides of a housing of the parking brake system.

BRIEF DESCRIPTION OF THE DRAWINGS

Further objectives, advantages, features and application possibilities of the present invention emerge from the following description of the exemplary embodiments with reference to the drawings, in which.

DETAILED DESCRIPTION OF PREFERRED EMBODIMENT

Figure 1:
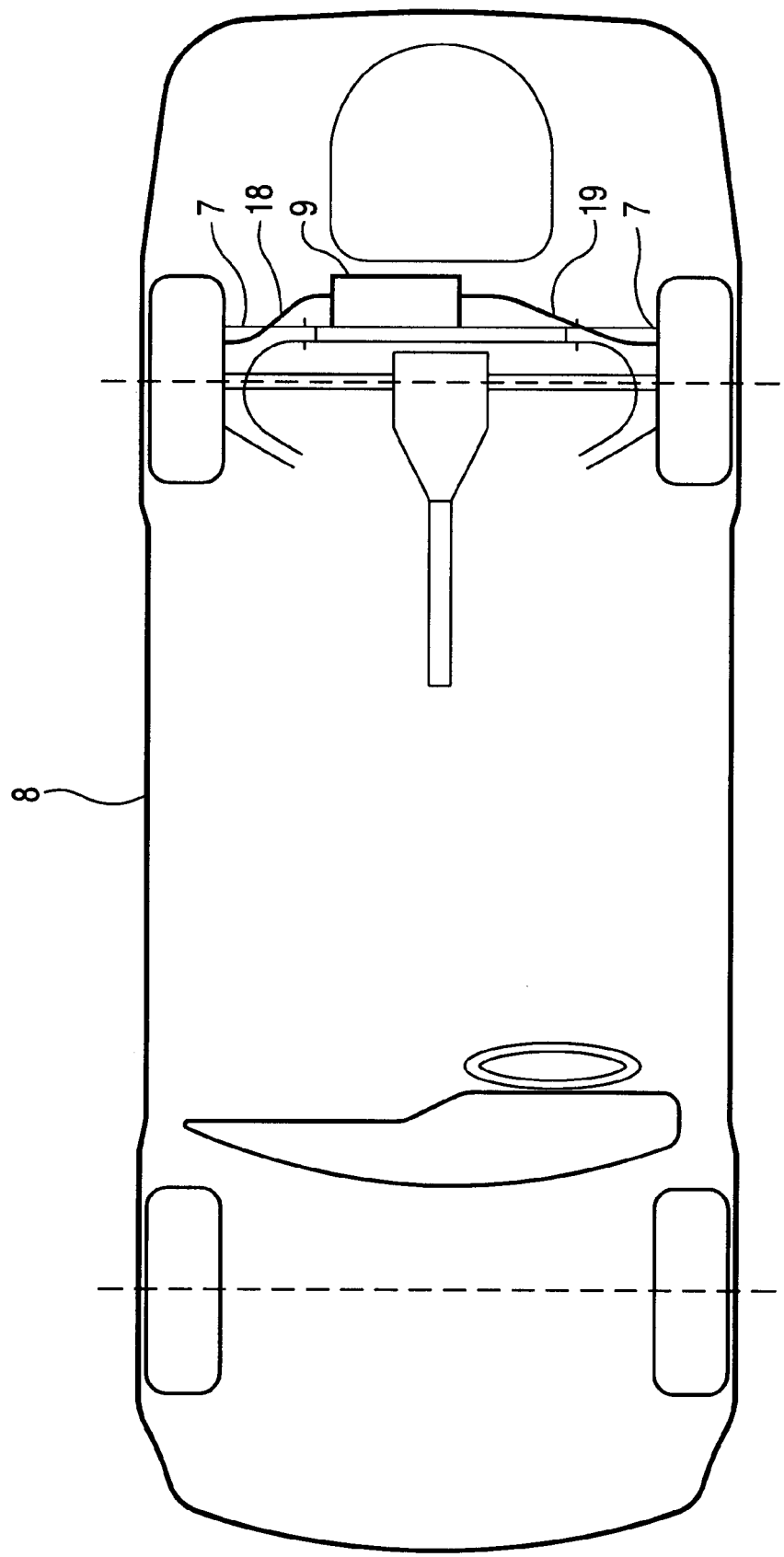
FIG. 1 shows, in a schematic view, a passenger vehicle with the parking brake system according to the invention installed.

In FIG. 1 the installation location of the parking brake system according to the present invention in a passenger vehicle 8 is shown in more detail. The adjusting unit 9 is fastened in the region of the rear axle of the passenger vehicle 8, the two actuating pulls 18, 19 serving to actuate the two brakes of the brake device 7 of the rear wheels.

Figure 2A:
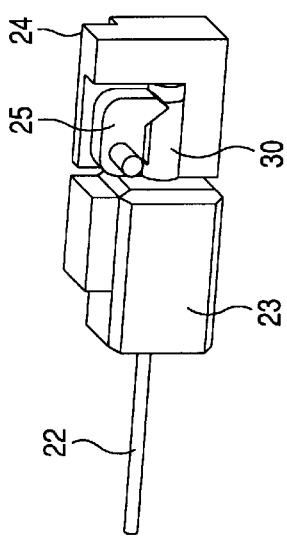
FIG. 2a shows the release device of FIG. 2 in the locked state.
Figure 2:
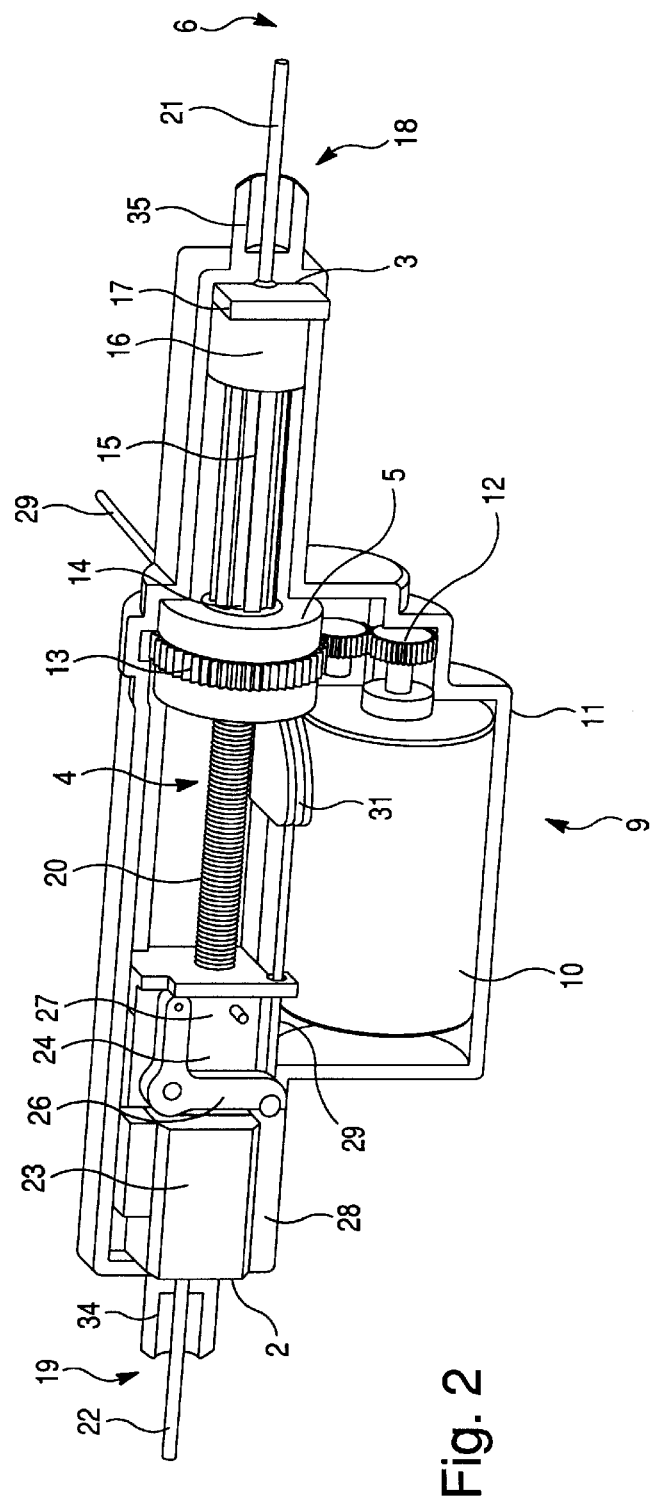
FIG. 2 shows a perspective view of an exemplary embodiment of the parking brake system according to the invention with the housing (part of which is not shown), the actuating pulls being released.

In FIG. 2 the adjusting unit 9 is shown in detail and with the parking brake released. The adjusting unit 9 has a housing 11 in which in addition to a motor drive 10 and a set of gears 12 a component 5, which is designed as a gearwheel 13, is arranged. The gearwheel 13 has a splined hub 14 and is mounted in the housing 11 such that it can rotate about a longitudinal axis 6 but such that it is non-displaceable with respect to the longitudinal axis 6. The component 5 interacts with a telescopic device 4 which has a first axial end 2 and a second axial end 3. If the motor drive 10 causes the component 5 to rotate, the telescopic device 4 rotates at the same time since it is coupled in a rotationally fixed manner to the component 5. However, the telescopic device 4 is mounted such that it can be displaced with regard to the longitudinal axis 6 in the component 5. The telescopic device 4 is formed by a splined shaft 15 and a spindle 20. For this purpose, the splined shaft 15 is designed as a hollow shaft having an internal thread which interacts with the spindle 20. The free axial end 3 of the splined shaft 15 has a bearing 16 with a means 17 of protecting against rotation for an internal pull 21 of an actuating pull 18 for the first brake. In the event of a rotation of the gearwheel 13 and the concomitant rotation of the splined shaft 15 about the longitudinal axis 6, the spindle 20 is either screwed into the splined shaft 15 or unscrewed from it depending on the direction of rotation. The other internal pull 22 of the second actuating pull 19 is fastened to the opposite, free axial end 2 of the spindle 20. On actuation of the motor drive 10 and rotation of the gearwheel 13, there thus occurs, depending on the direction of rotation, a telescopic shortening or lengthening of the telescopic device 4, in particular of the spindle 20 and the splined shaft 15, with the result of the two brakes being closed or opened via the internal pulls 21 and 22. The two free axial ends 2 and 3 of the telescopic device 4 are thus in each case connected to one of the internal pulls 21, 22 of the actuating pulls 18, 19. The external sheaths of these actuating pulls 18, 19 are accommodated in axial sockets 34, 35 on the end sides of the housing 11 of the parking brake system.

An essential measure for the refinement of the exemplary embodiment is that the telescopic device 4 or the splined shaft 15 is accommodated in an axially freely displaceable manner in the socket of the component 5, in particular in the splined hub 14 of the gearwheel 13. By this means, the telescopic device 4 is mounted in a floating manner within the housing 11. This compensating action ensures, on the one hand, that the two brakes are actuated evenly and, on the other hand, that the housing 11 of the parking brake system is not subjected to the entire force which acts on the brake shoes but rather at most to a differential force which may be present between the actuating forces of the two brakes.

Figure 3A:
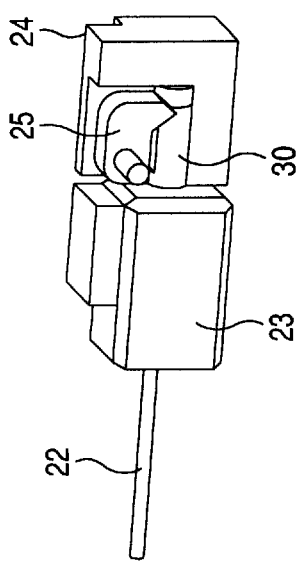
FIG. 3a shows the release device in the locked state.
Figure 3:
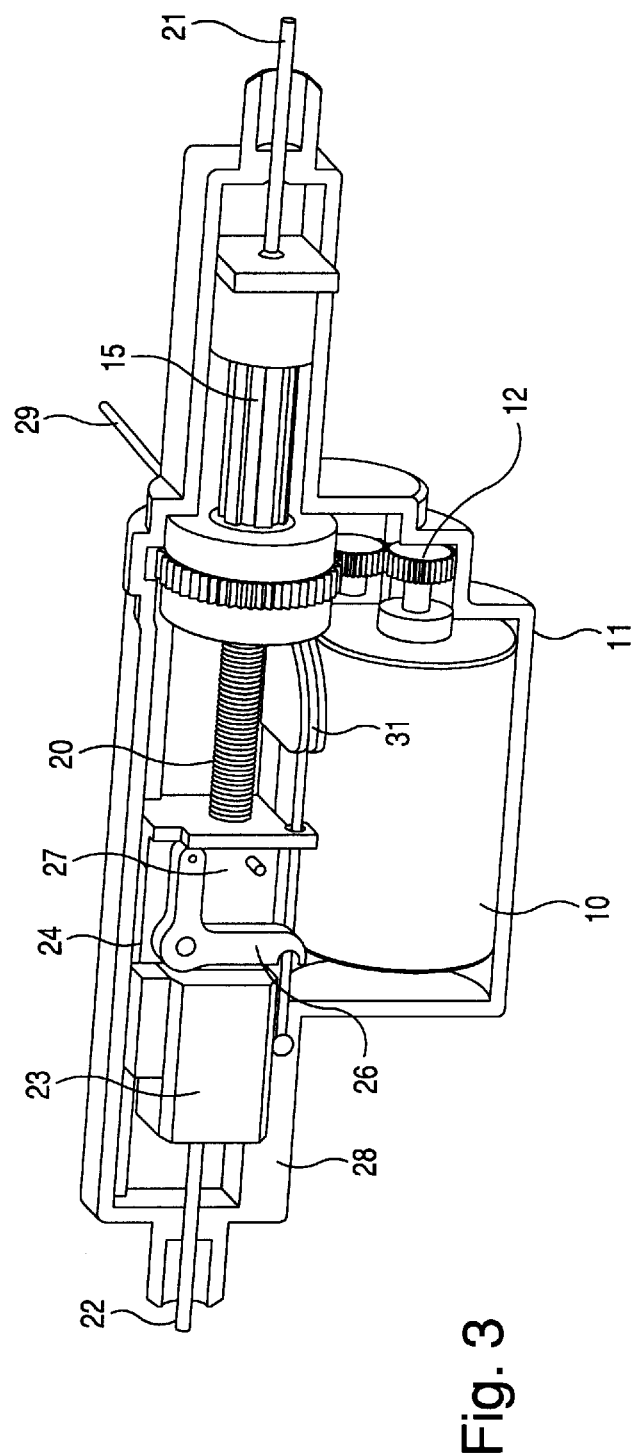
FIG. 3 shows the parking brake system of FIG. 2, the actuating pulls and therefore the brakes being applied by the telescopic device being shortened.

In FIG. 3 the parking brake system of FIG. 2 with the shortened telescopic device 4 is shown, the brakes being transferred into the closed or applied state. It can clearly be seen that the splined shaft 15 or the telescopic device 4 adopts a different axial position with regard to the component 5 or gearwheel 13. This can be attributed to, for example, different rates of wear of the two brakes to be actuated or to a compensation of the differences in length of the internal pulls 21, 22.

As can be seen from the drawings, a force sensor 23 is integrated in the telescopic device 4. This alternative measure has the advantage that in the event of the occurrence of very high tensile forces which exceed a certain acceptable limit value, the force sensor can be used to switch off the adjusting unit 9 of the motor drive 10, for example, in order to avoid damage to the brakes or the actuating pulls 18, 19.

Figure 4A:
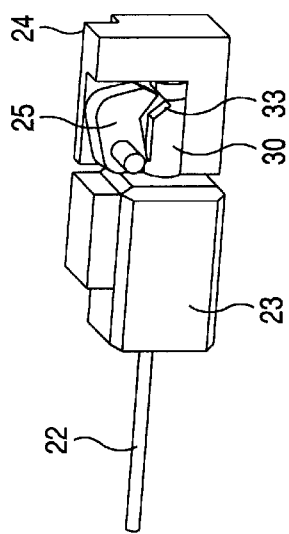
FIG. 4a shows the release device during the unlocking procedure.
Figure 4:
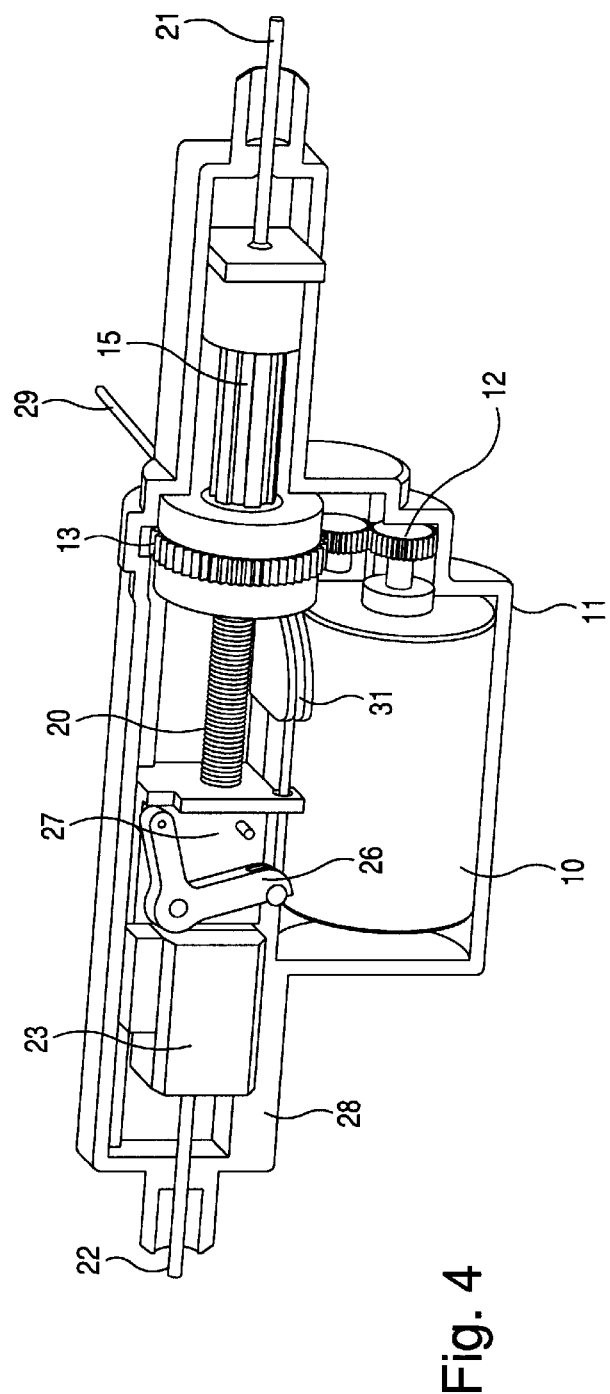
FIG. 4 shows the parking brake system of FIG. 3, the unlocking lever for the release device being actuated.
Figure 5A:
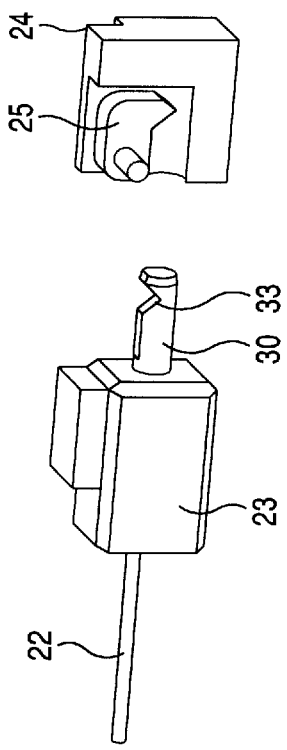
FIG. 5a shows the release device in the completely unlocked state.
Figure 5:
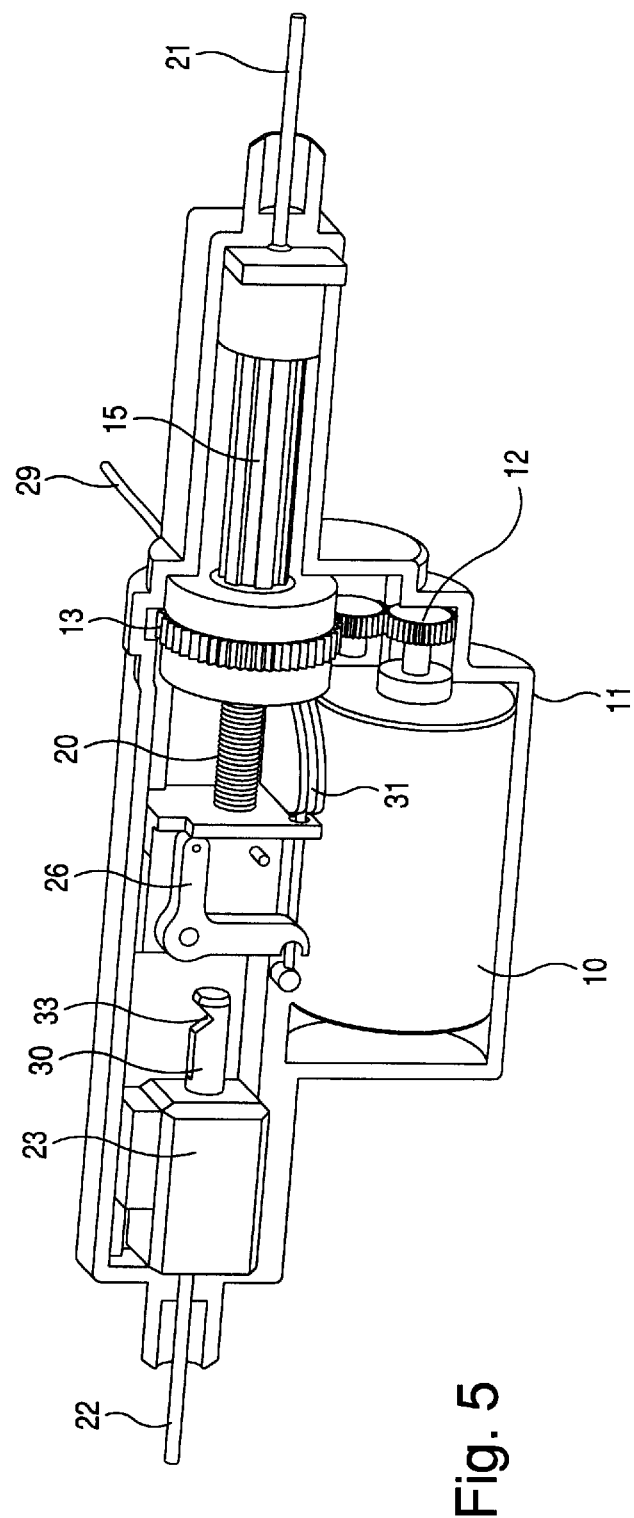
FIG. 5 shows the parking brake system of FIG. 4 with the release device unlocked.

According to a particularly advantageous, independent refinement of the invention, a release device 24 is integrated in the telescopic device 4. This release device 24, which can preferably be actuated mechanically, serves, in the event of a malfunction, for example a failure of the motor drive 10 and applied parking brake, to release the mechanical connection of the axial ends 2 and 3 of the telescopic device 4 from each other. As can be seen in the figures, this release device 24 consists of a pull 25 which can be actuated by a spring-loaded unlocking lever 26. When the unlocking lever 26 is actuated, the fixed mechanical connection between the free axial ends 2 and 3 of the telescopic device 4 is released. The release device 24 is held in the locking position by means of the spring 27. Unlocking can be achieved by actuating the actuating pull 29, as a result of which the unlocking lever 26 is pivoted into an unlocking position. This state can be seen in FIGS. 4, 4a. In particular in FIG. 4a it can be seen that in the unlocked state the pull 25 is no longer placed into the socket 33 of the stud 30, which is arranged on the force sensor 23 in the present exemplary embodiment. Of course, there is also the possibility of coupling the internal pull 22 directly to the stud 30. In order to keep the actuating pull 29 for the release device 24 under tension, the end of the actuating pull 29 is coupled to the housing 11 of the parking brake system by means of a spring 28. This actuating pull 29 is guided out of the housing 11 via a deflecting means 31.

In the event of a misoperation of the mechanical unlocking it is easily possible to make the parking brake system useable again. For this purpose, the motor drive 10 is operated so that the free end of the splined shaft 15 is supported on the housing 11 and the threaded spindle 20 is displaced in the direction of the stud until the pull 25 snaps into the socket 33 of the stud 30.

What is claimed is:

1. A parking brake system for vehicles, having an adjustable unit (9), which has a motor drive (10), for applying or releasing at least one actuating pull (18, 19) of a brake device (7) of the vehicle, the drive (10) being drive-connected to a component (5), which is mounted such that said component (5) can rotate about a longitudinal axis (6) and such that said component (5) is non-displaceable with respect to the longitudinal axis (6), the component (5) being coupled to a telescopic device (4) which is arranged such that it can be displaced in the direction of the longitudinal axis (6), an axial length of the telescopic device (4) being increased or reduced as a function of the direction of rotation of the component (5), and each axial end (2, 3) of the telescopic device (4) being connected indirectly or directly in each case to said at least one actuating pull (18, 19) for a brake of the brake device (7), wherein the telescopic device (4) is formed by a single splined hollow shaft (15) which is coupled to the component (5) in a rotationally fixed mainer and can be displaced relative to the component (5) in the direction of the longitudinal axis (6), and by a single spindle (20), which is mounted rotatably in the hollow shaft.

2. The parking brake system as claimed in claim 1, wherein the component is designed as a gearwheel (13) having an axial splined hub (14).

3. The parking brake system as claimed in claim 1 wherein the hollow shaft has an axial bore which is provided with an internal thread and accommodates the spindle (20), having an external thread.

4. The parking brake system as claimed in 1, wherein a force sensor (23), which is connected to a control of the adjusting unit (9), is integrated in the telescopic device (4).

5. A parking brake system for vehicles, having an adjustable unit (9), which has a motor drive (10) for applying or releasing at least one actuating pull (18, 19) of a brake device (7) of the vehicle, the drive (10) being drive-connected to a component (5), which is mounted such that said component (5) can rotate about a longitudinal axis (6) and such that said component (5) is non-displaceable with respect to the longitudinal axis (6), the component (5) being coupled in a rotationally fixed manner to a telescopic device (4) which is arranged such that it can be displaced in the direction of the longitudinal axis (6), an axial length of the telescopic device (4) being increased or reduced as a function of the direction of rotation of the component (5), and each axial end (2, 3) of the telescopic device (4) being connected indirectly or directly in each case to said at least one actuating pull (18, 19) for a brake of the brake device (7), wherein the telescopic device (4) is formed by a hollow splined shaft (15), which can be displaced in the direction of the longitudinal axis (6), and by a single spindle (20), which is mounted rotatable in the hollow splined shaft, and wherein a release device (24), via which the mechanical connection of the axial ends (2, 3) of the telescopic device can be released, is integrated in the telescopic device (4).

6. The parking brake system as claimed in claim 5, wherein the release device (24) has a pull (25) which interacts with a stud (30), and engages into a socket (33), and is pretensioned in the locking position.

7. The parking brake system as claimed in claim 6, wherein the pull (25) can be transferred into the unlocking position by means of an actuating pull (29).

8. The parking brake system as claimed in claim 1, wherein the free, axial ends (2, 3) of the telescopic device (4) are in each case connected to an internal pull (21, 22) of the actuating pulls (18, 19), and external sheaths of the actuating pulls (18, 19) are accommodated in axial sockets (34, 35) on the end sides of a housing (11) of the parking brake system.

9. The parking brake system of claim 1, wherein said component (5) is adapted to receive said hollow shaft (15), said hollow shaft (15) thereby passing through said component (5) when said axial length of said telescopic device (4) is changed.

* * * * *